US008024101B2

(12) United States Patent
Frolí K

(10) Patent No.: US 8,024,101 B2
(45) Date of Patent: Sep. 20, 2011

(54) UNDERCARRIAGE FOR HOSPITAL BED

(75) Inventor: Zbynek Frolí K, Slany (CZ)

(73) Assignee: LINET spol. s.r.o., Slany (CZ)

( * ) Notice: Subject to any disclaimer, the term of this patent is extended or adjusted under 35 U.S.C. 154(b) by 688 days.

(21) Appl. No.: 12/093,169

(22) PCT Filed: Oct. 30, 2006

(86) PCT No.: PCT/CZ2006/000074
§ 371 (c)(1),
(2), (4) Date: May 9, 2008

(87) PCT Pub. No.: WO2007/054037
PCT Pub. Date: May 18, 2007

(65) Prior Publication Data

US 2008/0234913 A1 Sep. 25, 2008

(30) Foreign Application Priority Data

Nov. 10, 2005 (CZ) ................................ 2005-17161

(51) Int. Cl.
*B60K 1/00* (2006.01)
*B60T 8/172* (2006.01)

(52) U.S. Cl. ............. 701/70; 701/1; 180/19.1; 180/281; 188/1.12; 280/47.34

(58) Field of Classification Search ................. 307/10.8; 701/70; 188/1.12
See application file for complete search history.

(56) References Cited

U.S. PATENT DOCUMENTS 3,247,923 A * 4/1966 Cornell ........................ 180/19.1
6,098,732 A * 8/2000 Romick et al. .................. 180/23
6,772,850 B1 * 8/2004 Waters et al. ............. 180/65.51
2003/0214185 A1 * 11/2003 Kinder et al. ................ 303/192
2006/0102392 A1 * 5/2006 Johnson et al. ............. 180/19.1
2007/0051566 A1 * 3/2007 Marlow .......................... 188/20
2009/0120736 A1 * 5/2009 Masterson et al. ............. 188/19

FOREIGN PATENT DOCUMENTS

JP 2003 153962 5/2003
RU 2 177 889 1/2002
WO 02/074216 9/2002

* cited by examiner

*Primary Examiner* — Thomas Black
*Assistant Examiner* — Lin B Olsen
(74) *Attorney, Agent, or Firm* — Hovey Williams LLP

(57) ABSTRACT

An undercarriage for a hospital bed including at least three wheels (1) while at least two wheels (1) are equipped with a brake (2) with a common control (9) of all the brakes (2). The undercarriage further includes a bed movement sensor (31) that is connected to the central processor unit (32), which is interconnected with an actuating device (33) for control of all the brakes (2). The central processor unit (32) is further equipped with a block (35) for generation of a timeout between stopping of turning of the wheel (1) and automatic applying of the brakes (2).

9 Claims, 2 Drawing Sheets

36 35 33 32 4 4 10 8 C 9 4 D A B 3 1 1 9 1 1 31 34

UNDERCARRIAGE FOR HOSPITAL BED

This is a national phase application of International Application PCT/CZ2006/000074 filed Oct. 30, 2006, and claiming priority from Czech application no. PUV 2005-17161 filed 10 Nov. 2005, the disclosures of which are incorporated herein by reference.

TECHNICAL FIELD

The invention relates to an undercarriage for hospital bed comprising at least three wheels while at least two wheels are equipped with a brake with a common control of all the brakes.

BACKGROUND ART

Known undercarriages of hospital beds mostly have four or five wheels that can turn around their horizontal as well as vertical axis. The undercarriage has a control mechanism that comprises a common three-position control that can be controlled from several places, e.g. with a system of mechanically interconnected levers positioned at individual wheels.

In the central position of the levers of the three-position control all the wheels can freely turn around their horizontal as well as vertical axis. This position is referred to as "unbraked" in this application. The bed can be freely moved to all directions.

In the lower position of the levers of the three-position control turning of all the wheels both around the horizontal and around the vertical axis is blocked. This position is referred to as "braked" in this application. The movement of the bed is blocked.

Finally, in the upper position of the levers of the three-position control turning of one wheel around the vertical axis is locked in a pre-selected position, generally in the position that is parallel to the longitudinal axis of the bed. The other wheels can freely turn both around their horizontal and around their vertical axis. The bed can be moved while the wheel locked in the position parallel to the longitudinal axis of the bed facilitates keeping the straight movement direction for the personnel transporting patients along hospital corridors.

Known undercarriages of hospital beds with five wheels work in the same way while their fifth wheel is positioned under the centre of the bed and can be locked in a pre-selected position with the above mentioned three-position control, common for the control of the functions of all the wheels described above.

In the latest versions of undercarriages the control mechanism comprises a separate two-position control that controls brakes of all braked wheels and a separate control that controls locking of wheels the turning of which around the vertical axis can be locked in a pre-selected position.

A common disadvantage of all the known undercarriages for hospital beds is that if after stopping and putting the bed aside the staff member forgets to brake the undercarriage, the patient may get injured if he/she leans against the bed thinking that it is braked. In such a case the bed starts to move and the patient may fall, which may have severe consequences, especially in the case of older or disorientated patients.

So the aim of the invention is to design such an undercarriage for hospital beds that will exclude the above mentioned mistakes of the staff.

SUMMARY OF THE INVENTION

The above mentioned goal is achieved with an undercarriage for hospital bed comprising at least three wheels while at least two wheels are equipped with a brake with a common control of all the brakes. The undercarriage further comprises a bed movement sensor that is connected to the central processor unit. The central processor unit is interconnected with an actuating device for control of all the brakes. The central processor unit is further equipped with a block for generation of a timeout between stopping of turning of the wheel and automatic applying of the brakes.

Such a design of a hospital bed undercarriage guarantees that a stationary bed will always be braked, regardless of qualifications of the staff.

In a preferred embodiment the movement sensor of the bed comprises of a turning sensor of at least one of the wheels.

To avoid unnecessary activation of the actuating device for the brake control, in a preferred embodiment a sensor of the status of at least one of the brakes is connected to the central processor unit.

In a preferred embodiment the used sensors are optoelectronic or magnetic.

In accordance with another preferred embodiment the central processor unit is equipped with a block for setting of a timeout between stopping of turning of a wheel and automatic applying of the brakes. This advantageous version allows changing the set timeout between stopping of wheel turning and automatic braking as necessary.

BRIEF DESCRIPTION OF DRAWINGS

The undercarriage according to the invention will be described in a more detailed way with the use of a sample version presented in attached drawings where individual figures show.

DESCRIPTION OF THE PREFERRED EMBODIMENT

Figure 1:
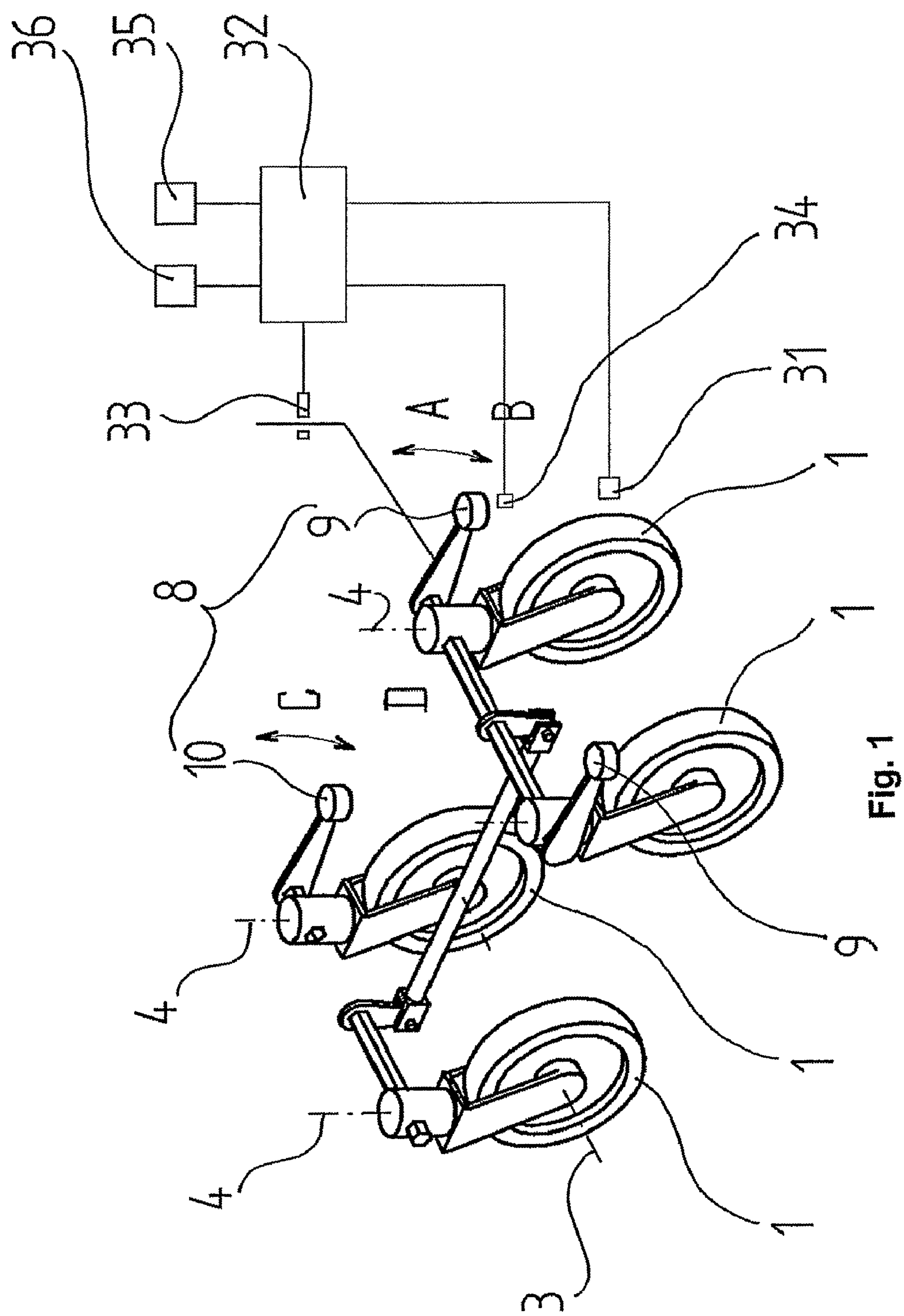
FIG. 1 is a schematic representation of the undercarriage according to the invention

FIG. 1 shows a hospital bed undercarriage that has four wheels 1 that can turn around their horizontal axis 3 and vertical axis 4. The control mechanism 8 comprises the first two-position control 9 for control of brakes 2 of three wheels 1 and another two-position control 10 used for locking of turning of the remaining fourth wheel 1 around its vertical axis 4 in a pre-selected position. The first two-position control 9 according to the sample version shown in FIG. 1 consists of two levers that are connected to brake cams 11 of all the three wheels 1 with rods and draw-bars. The second two-position control 10 according to the sample version shown in FIG. 2 consists of a lever that is connected to the locking cam installed in the remaining fourth wheel 1.

The second two-position control 10, which controls locking of turning of the remaining fourth wheel 1 around its vertical axis 4 in a pre-selected position, is not subject to this technical design and this is why it will not be described in a detailed way.

Naturally, the two-position controls 9, 10 do not only have to be mechanical. It can be advantageously used any known two-position electric, pneumatic or hydraulic actuating device. In such a case the control does not consist of levers and appropriate switches can be used, installed next to each other on the bed handle, within the reach of the nursing staff.

The first two-position control 9 used to control the brakes 2 of three wheels 1 has the "unbraked" position (in FIG. 1 position A), in which the three wheels 1 can freely turn around their horizontal axis 3 as well as vertical axis 4 and the "braked" position (in FIG. 1 position B), in which turning around the horizontal axis 3 as well as turning around the vertical axis 4 of all the wheels is blocked.

Figure 2:
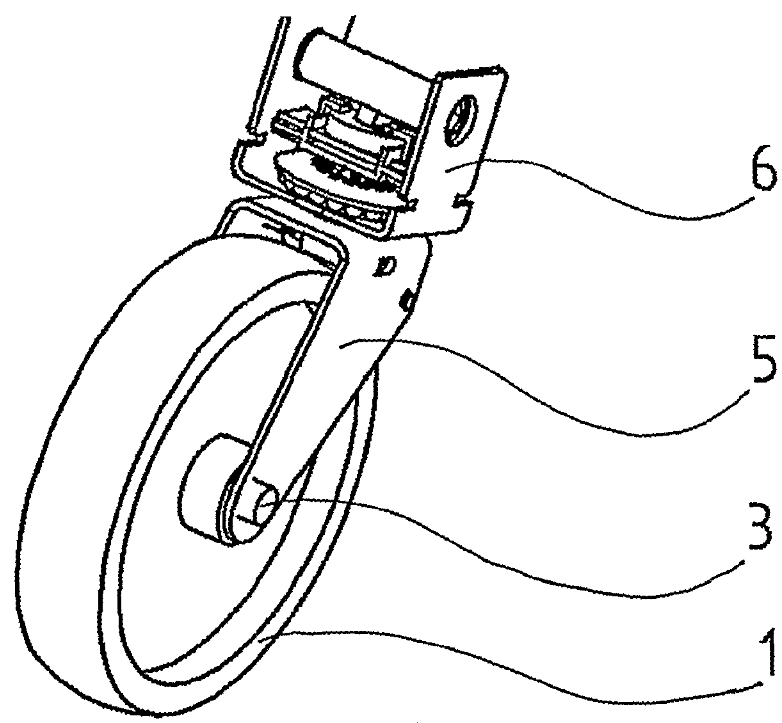
FIG. 2 is an overall view of a used wheel
Figure 3:
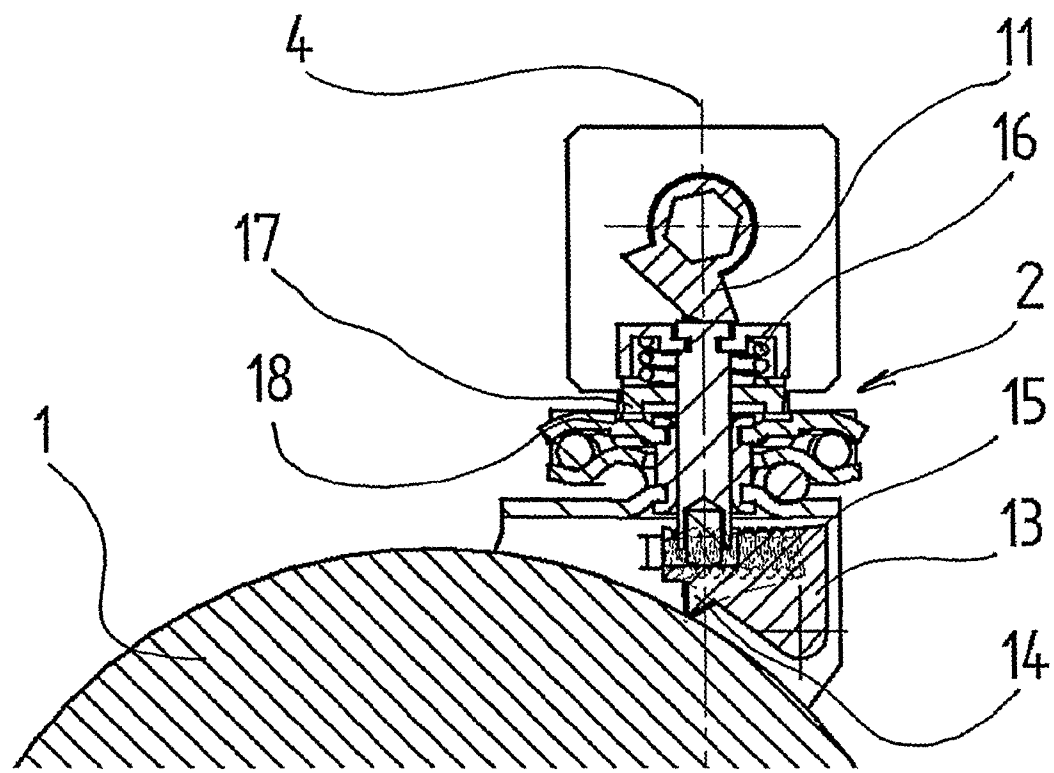
FIG. 3 represents a cross-section of the wheel shown in FIG. 2

FIGS. 2 and 3 show a sample version of a wheel 1 with a brake 2. The wheel 1 with a rubber tyre is installed in a fork 5 in such a way that it can turn around its horizontal axis 3 while the fork 5 is installed in its holder 6 in such a way that it can turn around its vertical axis. The holder 6 is fixed to the frame of the hospital bed.

The first two-position control 9 used to control the brakes 2 is connected to the brake cam 11 installed in each of the three wheels 1. The brake cam 11 bears on a braking pin 12 installed in a sliding way that at the opposite side bears on a swinging brake jaw 13 equipped with a braking tip. The brake jaw 13 is pushed away from the surface of the wheel 1 with a wound spring 15. The braking pin 12 further with the use of a braking spring 16 slides the brake teeth 17 of the holder 6 to the engagement with the brake teeth 18 of the fork 5 of the wheel 1.

FIG. 1 shows that the undercarriage is equipped with a bed movement sensor 31, which in the sample version comprises an optoelectronic sensor of turning of one of the wheels 1. Person skilled in the art finds it obvious that any known movement sensor can be used.

The bed movement sensor 31 is connected to the central processor unit 32, e.g. a microcomputer, installed on the bed frame, not shown here. An optoelectronic sensor 34 of the status of the brake 2 is also connected to the central processor unit 32. This sensor registers whether the brake 2 is in the "braked" or "unbraked" status.

What is also connected to the central processor unit 32 is the actuating device 33 that controls all the brakes 2. In the sample version the actuating device 33 for the control of all the brakes 2 consists of an electric servomotor that changes the position of the first two-position control 9.

The central processor unit 32 is further equipped with a block 35 for generation of the timeout between stopping of turning of a wheel 1 and automatic engagement of the brakes 2. The length of the timeout can be either fixed during production or the central processor unit 32 is equipped with a block 36 that can be used to set the timeout as required. In the sample version the timeout setting block 36 consists of an external keyboard.

During the movement of the hospital bed (not shown here) the wheel 1 turns and its movement is detected by the optoelectronic sensor 31 and the signal is transmitted to the central processor unit 32. Whenever the wheel 1 stops, the timeout generation block 35 in the central processor unit 32 starts counting down the pre-set timeout. After expiration of this timeout the central processor unit 32 analyzes the signal of the optoelectronic sensor 34 of the brake 2 status and if the brake 2 is in the "unbraked" status", the above mentioned central processor unit 32 sends a signal to the actuating device 33 that controls all the brakes 2. The actuating device 33, in the sample version an electric servomotor, switches the first two-position control 9 over to the "braked" position, which automatically applies the brakes 2 in three wheels 1.

In a simplified version that is not shown here the central processor unit 32 is not interconnected with the sensor 34 of the status of the brake 2 and the command to the actuating element 33 is sent to the central processor unit 32 immediately after expiration of the pre-set timeout.

In the presented version the length of the timeout between stopping of turning of the wheel 1 and automatic applying of the brakes 2 can be changed any time by entering of new data from the external keyboard of the timeout setting block 36.

To be able to move the bed again the personnel must put the control 9 for control of brakes 2 of three wheels 1 into the "unbraked" position (in FIG. 1 position A). This action at the same time activates a new monitoring cycle of turning of the wheel 1 in the central processor unit 32.

After switching over the first two-position control 9 that control the brakes 2 of three wheels 1 to the "braked" position (in FIG. 1 position B) the braking cams 11 of all the three wheels 1 push the corresponding braking pin 12 downwards (see FIG. 3). The braking pin 12 turns the brake jaw 13 so its braking tip 14 bears on the surface of the wheel 1 and prevents its turning around the horizontal axis 3. At the same time during the downward movement the braking pin 12 with the use of the braking spring 16 causes engagement of the braking teeth 17 of the holder 6 with the braking teeth 18 of the fork 5 of the wheel 1. This way turning the three wheels 1 around their vertical axes 4 gets blocked at the same time.

The braking spring 16 ensures engagement of the braking teeth 17 of the holder 6 with the braking teeth 18 of the fork 5 even in case the initial position of both the sets of teeth 17, 18 is not ideal.

After switching over the first two-position control 9 that controls the brakes 2 of three wheels 1 to the "unbraked" position (in FIG. 1 position A) the force of the wound spring 15 returns the braking pin 12 to its upper position, so the braking tip 14 is drawn away from the surface of the wheel and the braking teeth 17 of the holder 6 are drawn away from the braking teeth 18 of the fork 5 of the wheel 1. So all the three wheels 1 can freely turn around their horizontal axis 3 as well as vertical axis 4.

The invention claimed is:

1. An undercarriage for a hospital bed having at least three wheels wherein at least two of said wheels are equipped with a respective brake and having a common control of all the brakes of said at least two wheels, said undercarriage further comprising:

- a central processor unit;
- a bed movement sensor that is connected to the central processor unit;
- an actuating device operatively connected to the central processor unit for control of all the brakes, and
- wherein the central processor unit is further equipped with a subroutine for generation of a timeout between a stopping of turning of at least one of the wheels and automatic applying of the brakes.

2. The undercarriage for a hospital bed according to claim 1, wherein the bed movement sensor comprises a sensor for sensing turning of at least one of the wheels.

3. The undercarriage for a hospital bed according to claim 1, further including a sensor for sensing the status of at least one of the brakes and which is connected to the central processor unit.

4. The undercarriage for a hospital bed according to claim 3, wherein the sensor for sensing the status of at least one of the brakes and which is connected to the central processor unit is optoelectronic.

5. The undercarriage for a hospital bed according to claim 3, wherein the sensor for sensing the status of at least one of the brakes and which is connected to the central processor unit is magnetic.

6. The undercarriage for a hospital bed according to claim 1, wherein the bed movement sensor is optoelectronic.

7. The undercarriage for a hospital bed according to claim 1, wherein the central processor unit is equipped with a second subroutine for setting of the timeout between a stopping of turning of at least one of the wheels and automatic applying of the brakes.

8. The undercarriage for a hospital bed according to claim 1, wherein the bed movement sensor is magnetic.

9. An undercarriage for a hospital bed having at least three wheels and brakes operative for respectively braking at least two of said wheels, the undercarriage further including a common control operatively connected to the respective brakes of said at least two of said wheels, said undercarriage further comprising:

a central processor unit;

a bed movement sensor operatively connected to the central processor unit for signaling turning of at least one of said wheels;

an actuating device for actuating the brakes responsive to a braking signal from the central processor unit; and a subroutine operatively connected to said central processor unit for generation of an interval signal delaying sending of the braking signal to the actuating device for a selected interval after said bed movement sensor signals the turning of said at least one of said wheels has stopped.

* * * * *